Oct. 28, 1969 E. J. PORCELLI ET AL 3,475,729
INPUT/OUTPUT CONTROL APPARATUS IN A COMPUTER SYSTEM
Filed May 27, 1966
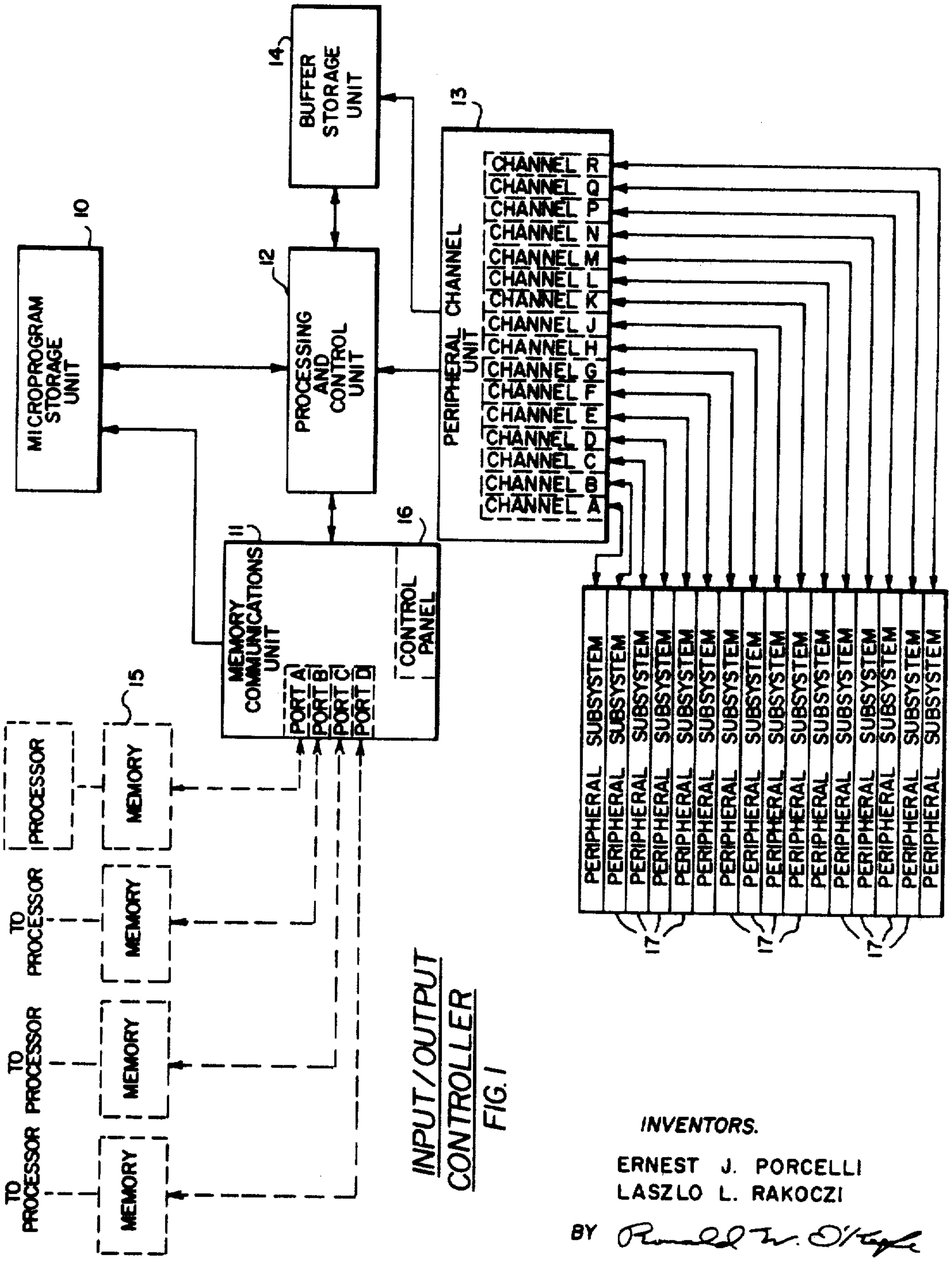
INPUT/OUTPUT CONTROLLER FIG. 1
INVENTORS.
ERNEST J. PORCELLI
LASZLO L. RAKOCZI
BY Ronald W. O'Keefe
ATTORNEY United States Patent Office 3,475,729

Patented Oct. 28, 1969

3,475,729

INPUT/OUTPUT CONTROL APPARATUS IN A COMPUTER SYSTEM

Ernest J. Porcelli and Laszlo L. Rakoczi, Phoenix, Ariz., assignors to General Electric Company, a corporation of New York Filed May 27, 1966, Ser. No. 553,342
Int. Cl. G11b *13/00*
U.S. Cl. 340—172.5 7 Claims

ABSTRACT OF THE DISCLOSURE

In a data processing system wherein data control words associated with each of a plurality of peripheral subsystems are employed to control information transfer between memory and a corresponding peripheral subsystem, an input/output controller is utilized which includes a processing and a control unit whereby data control words may be retrieved, manipulated, processed, and restored to a memory whereby data transfer is effected independent of the processor. The processing and control unit serves each of the peripheral subsystems and is shared, on a time division basis, to perform the necessary operations on the data control words.

This invention relates to computer systems and, in particular, to apparatus for controlling the transfer of information to and from the peripheral subsystems of a computer system.

A computer system normally comprises at least one data processor, at least one data storage unit or memory, and at least one input/output controller associated with a plurality of peripheral input and output devices or subsystems. Each data processor in the computer system processes data by executing a program. Each data storage unit of the computer system stores data to be processed, data which is the result of processing, and programs for controlling the processing operations of a data processor. The peripheral input devices supply to a data storage unit, through the input/output controller, programs and data to be processed. The peripheral output devices receive processed data from a data storage unit, through the input/output controller, and utilize or store such processed data. In the described computer system, the input/output controller provides control and a communications path for transfer of programs and data to be processed from the peripheral input devices to a data storage unit. The input/output controller also provides control and a communications path for transfer of processed data from a data storage unit to the peripheral output devices.

A data processor of the computer system executes one or more programs. A program comprises a set of instructions, each instruction specifying a discrete type of processing operation in the computer system. A data processor executes a program by sequentially responding to each of the instructions of the program to perform the corresponding operations. The processing operations specified by the instructions of a program normally require interaction of a data storage unit with the data processor executing the program and often require a similar interaction with an input/output controller. The entire computer system is thus responsive to the program being executed by a data processor of the computer system.

An input/output controller of the computer system performs control and information transmission operations for its respective set of peripheral input and output devices. An input/output controller controls the storage of information items provided by each of its associated peripheral input devices or subsystems in a respective set of storage locations of a data storage unit. Thus, in transmitting the information items supplied in succession by a particular peripheral input device, an input/output controller supplies in sequence addresses of the storage locations of a data storage unit for receiving and storing the information items. Similarly, information items for transmission to each of its associated peripheral output devices are obtained by the input/output controller from a respective set of storage locations of a data storage unit. Thus, in transmitting information items in succession to a particular peripheral output device, an input/output controller also supplies in sequence addresses of the storage locations of a data storage unit for retrieving the information items.

Addresses of the storage locations of the data storage unit in which information items transmitted from a peripheral subsystem are to be stored or from which information items are to be obtained for transfer to a peripheral subsystem are normally provided by a control item associated with the peripheral subsystem. Various operations involving the control items employed to control data transfer with the peripheral subsystems are necessary during operation of the input/output controller. For example, the address portion of a control item must be updated each time an information item is transferred between a data storage unit and the corresponding peripheral subsystem, preparatory to providing the correct address for the next information transfer with the peripheral subsystem.

The operations involving the control items are normally performed in the input/output controller by apparatus associated with each peripheral subsystem. Thus, in an input/output controller connected to N peripheral subsystems, N sets of apparatus for performing operations on the control items are provided. Such an arrangement increases the initial cost of a computer system and decreases its reliability and simplicity, with resulting higher maintenance costs. Accordingly, it is desirable to obviate multiplication of apparatus in an input/output controller to provide a more economical arrangement for handling information transfers with peripheral subsystems.

It is therefore an object of this invention to provide improved input/output control apparatus in a computer system.

It is another object of this invention to provide apparatus for controlling information transfers between a data storage unit and a plurality of peripheral subsystems which has increased reliability and decreased cost.

It is a further object of this invention to provide input/output controller apparatus for more efficiently handling addressing requirements for data transfers between a data storage unit and a plurality of peripheral subsystems.

The foregoing objects are achieved, in accordance with the illustrated embodiment of the invention, by providing centralized apparatus for receiving, handling and performing operations on a plurality of data control words employed to control information transfers between a data storage unit and a corresponding plurality of peripheral subsystems. Each of the peripheral subsystems of the computer system is connected to a channel of the input/output controller, each of these channels providing an information transfer path between the corresponding peripheral subsystems and the buffer storage unit of the input/output controller. During transfer of information from a peripheral subsystem to memory, information transfer between the portions of the buffer storage unit allocated to the respective peripheral subsystem and the data storage unit of the system is performed, each time that this portion contains a predetermined quantity of information. During transfer of information from the data storage unit to a peripheral subsystem, a transfer of information from the data storage unit to the portion of the buffer storage unit allocated to the particular peripheral subsystem is effected when that portion has the capacity for receiving a predetermined quantity of information. In each case, the processing and control unit of the input/output controller retrieves the data control word corresponding to the peripheral subsystem to which or from which information is being transferred and utilizes this control word to provide an address of a storage location in the data storage unit to which or from which the information is transferred. The processing and control unit updates the address field of the data control word so that the data control word reflects the correct address for the next information transfer. The processing and control unit also renders the address in the address field of the data control word absolute, if necessary. The count field of the data control word is also modified by the processing and control unit to reflect the quantity of information transferred under control of the data control word. During each transfer of information between the data storage unit and the buffer storage unit relating to a different peripheral subsystem, the processing and control unit retrieves and utilizes the data control word corresponding to that peripheral subsystem, in addition to modifying the data control word preparatory to use in controlling a subsequent data transfer. Thus, each of the peripheral channels share, on the time division basis, the processing and control unit in effecting transfers of information between the data storage unit and the buffer storage unit and in performing the necessary operations on the data control word corresponding to that peripheral subsystem.

For a complete description of the system of FIGURE 1 and of our invention, reference is made to United States Patent No. 3,409,880 issued to G. M. Galler, Ernest J. Porcelli and Laszlo L. Rakoczi on Nov. 5, 1968, and assigned to the assignee of the present invention. More particularly, attention is directed to FIGURES 2*a*–188 and to the specification beginning at column 3, line 31, and ending at column 104, line 49, inclusive of United States Patent No. 3,409,880 which are incorporated herein by reference and made a part hereof as if fully set forth herein.

What is claimed is:

1. In a computer system, the combination comprising: a data processor, a plurality of data handling means, a data storage unit, predetermined storage locations of said data storage unit being assigned to store control items, one of said control items corresponding to each of said data handling means, a controller connected to said plurality of data handling means and to said data storage unit for transferring information between said data storage unit and a selected one of said data handling means under control of the corresponding one of said control words, signalling means for providing a control signal corresponding to each of said data handling means when a data transfer between said data storage unit and and a data handling means is required, priority means for receiving the output signals provided by said signaling means and for providing at predetermined times an output signal identifying the data handling means whose information item transfer requirement is to be serviced, control means included in said controller for receiving the control signals generated by said signaling means and responsive to a selected one of said control signals for causing the control item corresponding to the respective data handling means to be transferred from said data storage unit to said control means and for utilizing said control item to control the required transfer of information, and means included in said control means for performing operations on said control item before restoring the control item to its appropriate storage location in the data storage unit.

2. In a computer system wherein information is transferred between a data storage unit and a plurality of data handling means, the information transfer between each of the data handling means and the data storage unit being directed by a control item, the combination comprising: a data processor, first storage means for storing a plurality of control items, each control item corresponding to one of the data handling means of the computer system, signaling means for providing a signal corresponding to each of the data handling means when data transfer between the corresponding data handling means and the data storage unit is required, priority means for receiving the output signals provided by said signaling means and for providing at predetermined times an output signal identifying the data handling means whose information item transfer requirement is to be serviced, second storage means for storing one of said control items, means responsive to a signal provided by said signaling means for transferring one of said control items from said first storage means to said second storage means, control means responsive to the control item stored in said second storage means for controlling the transfer of information between the data storage unit and the corresponding data handling means, and means included in said control means for performing an operation on the control item stored in said second storage means and for causing the control item to be restored to said first storage means.

3. In a computer system wherein information is transferred between a data storage unit comprising a plurality of storage locations for storing information and a plurality of data handling means, the information transfer between each of the data handling means and the data storage unit being directed by a different control item, the combination comprising: a data processor, first storage means for storing a plurality of control items, each control item corresponding to one of the data handling means of the computer system, each control item comprising an address field identifying the storage location of the data storage unit with which an information transfer is to be effected, signaling means for providing a control signal corresponding to each data handling means when data transfer between the corresponding data handling means and the data storage unit is required, priority means for receiving the output signals provided by said signaling means and for providing at predetermined times an output signal identifying the data handling means whose information item transfer requirement is to be serviced, second storage means for storing a single control item, means responsive to a control signal provided by said signaling means for transferring the corresponding control item from said first storage means to said second storage means, control means responsive to the control item stored in said second storage means for controlling the transfer of information between the data storage unit and the corresponding data handling means, and means included in said control means for modifying the address field of the control item in said second storage means and for causing transfer of the modified control item to said first storage means.

4. In a computer system wherein information items are transferred between a data storage unit comprising a plurality of storage locations for storing information items and a plurality of data handling means, transfer of an information item between each of the data handling means and the data storage unit being directed by a different control item, the combination comprising: a data processor, first storage means for storing a plurality of control items, each of said control items corresponding to one of the data handling means of the computer system, signaling means for providing a signal corresponding to each of the plurality of data handling means when transfer of an information item between the corresponding data handling means and the data storage unit is required, priority means for receiving the output signals provided by said signaling means and for providing at predetermined times an output signal identifying the data handling means whose information item transfer requirement is to be serviced, second storage means for storing a single control item, selection means responsive to the signals provided by said signaling means for providing at predetermined times a signal identifying one of the data handling means requiring transfer with the data storage unit, means responsive to said selection means for causing transfer of the corresponding control item from said first storage means to said second storage means, control means responsive to the control item in said second storage means for controlling the transfer of an information item between said data storage unit and the corresponding data handling means, and means included in said control means for modifying the control item in said second storage means and for causing transfer of the modified control item to said first storage means.

5. In a computer system wherein information is transferred between a data storage unit comprising a plurality of storage locations for storing information and a plurality of data handling means, the information transfer between each data handling means and the data storage unit being directed by a control item, the combination comprising: a data processor, first storage means for storing a plurality of control items, each control item corresponding to one of the data handling means of the computer system, said first storage means also storing a plurality of identification items for identifying storage locations of said data storage unit containing other control items to be employed in directing information transfer between the data storage unit and the corresponding data handling means, signaling means for providing a signal corresponding to each of the data handling means when an information transfer between the corresponding data handling means and the data storage unit is required, priority means for receiving the output signals provided by said signaling means and for providing at predetermined times an output signal identifying the data handling means whose information item transfer requirement is to be serviced, second storage means for storing a single control item, means responsive to a signal provided by said signaling means for causing transfer of a corresponding control item from said first storage means to said second storage means, control means responsive to the control item stored in said second storage means for controlling the transfer of information between said data storage unit and the corresponding data handling means, and said control means including means responsive to an identification item in said first storage means for transferring the control item corresponding to the identification item from said data storage unit to said first storage means.

6. In a computer system, the combination comprising: a data processor, a plurality of data handling means, a data storage unit comprising a plurality of storage locations for storing information items, predetermined storage locations of said data storage unit being assigned to store control items, one of said control items corresponding to each of said data handling means, signaling means for providing a control signal corresponding to each of said data handling means when an information transfer between the corresponding data handling means and said data storage unit is required, priority means for receiving the output signals provided by said signaling means and for providing at predetermined times an output signal identifying the data handling means whose information item transfer requirement is to be serviced, storage means for storing a single control item, and means responsive to a control signal provided by said signaling means for causing transfer of the corresponding control item from said data storage unit to said storage means, and control means responsive to the control item stored in said storage means for controlling the transfer of information between the corresponding data handling means and said data storage unit.

7. In a computer system, the combination comprising: a data processor, a plurality of data handling means, a data storage unit comprising a plurality of storage locations for storing information items, predetermined storage locations of said data storage unit being assigned to store control items, each of said control items including an address field identifying a storage location of said data storage unit to which or from which an information item is to be transferred, one of said control items corresponding to each of said data handling means, signaling means for providing an output signal corresponding to each of said data handling means when transfer of an information item between the corresponding data handling means and said data storage unit is required, priority means for receiving the output signals provided by said signaling means and for providing at predetermined times an output signal identifying the data handling means whose information item transfer requirement is to be serviced, item storage means responsive to the output signal of said priority means for causing transfer of the control item corresponding to the identified data handling means from said data storage unit to said item storage means, control means responsive to the control item in said item storage means for controlling the transfer of an information item between the corresponding data handling means and the storage location of said data storage unit identified by the address field of the control item, and means included in said control means for modifying the address field of the control item in said item storage means and for causing transfer of the modified control item to the appropriate storage location of said data storage unit.

References Cited

UNITED STATES PATENTS

| | | | |
|---|---|---|---|
| 3,029,414 | 4/1962 | Schrimpf | 340—172.5 |
| 3,061,192 | 10/1962 | Terizian | 235—157 |
| 3,063,036 | 1/1962 | Reach | 340—172.5 |
| 3,200,380 | 8/1965 | MacDonald | 340—172.5 |

GARETH D. SHAW, Primary Examiner